United States Patent [19]

Galiana

[11] 4,077,056
[45] Feb. 28, 1978

[54] GROUND-FAULT CIRCUIT INTERRUPTER

[76] Inventor: Antonio Bou Galiana, Rambla del Caudillo, 54, San Baudilio de Llobregat (Barcelona), Spain

[21] Appl. No.: 669,987

[22] Filed: Mar. 24, 1976

[30] Foreign Application Priority Data

Mar. 26, 1975 Spain .................................... 436102

[51] Int. Cl.² ............................................ H02H 3/16
[52] U.S. Cl. ......................................... 361/50; 361/42
[58] Field of Search ................ 317/18 A, 18 R, 18 D, 317/18 C, 9 R, 9 A, 9 AC, 27 R, 154; 361/42, 49, 50, 47, 48

[56] References Cited

U.S. PATENT DOCUMENTS

| 2,622,139 | 12/1952 | Dodd | 317/18 R X |
|-----------|---------|------|------------|
| 2,660,717 | 11/1953 | Hood | 317/18 D |
| 2,881,361 | 4/1959 | Wood | 317/18 A |
| 3,483,431 | 12/1969 | Gilbert | 317/18 R |
| 3,676,738 | 7/1972 | Scanlan | 317/18 R |

FOREIGN PATENT DOCUMENTS 535,213  12/1958  Belgium ............................ 317/9 A Primary Examiner—J D Miller
Assistant Examiner—Patrick R. Salce
Attorney, Agent, or Firm—Michael J. Striker

[57] ABSTRACT

A ground-fault circuit interrupter has normally open relay contacts connected in series between an incoming hot line and an outgoing hot line. A coil of a detector relay is connected between the outgoing ground line and the outgoing cold line and closes when even a slight voltage differential appears between the outgoing ground line and outgoing cold line. Closing of the detector relay illuminates a short-indicating lamp and causes a further relay to latch on and disconnect the relay whose contacts are connected between the incoming hot line and outgoing hot line so that the device connected to the outgoing hot line is open-circuited. A reset button is provided for placing the circuit back in operative condition with a green OK lamp lighted.

9 Claims, 1 Drawing Figure

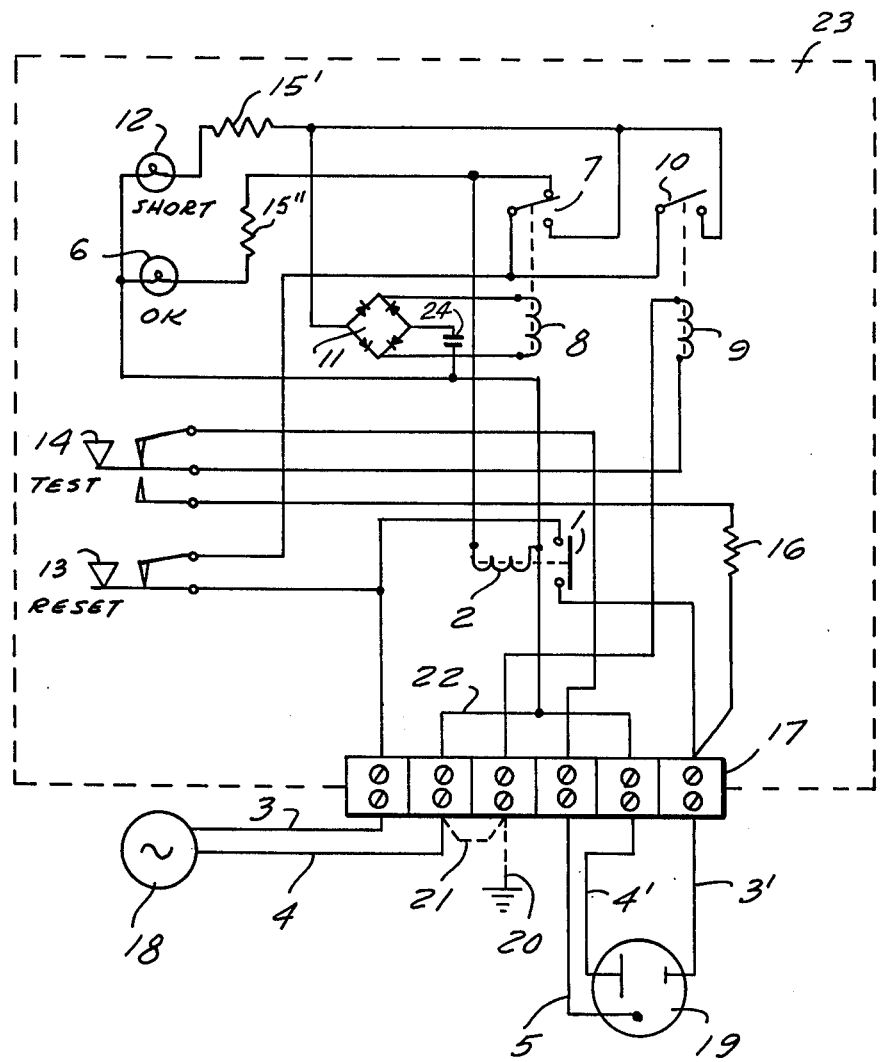

GROUND-FAULT CIRCUIT INTERRUPTER

BACKGROUND OF THE INVENTION

The present invention relates to a safety device. More particularly this invention concerns a groundfault circuit interrupter.

A particularly dangerous situation exists when a short circuit develops in a piece of electrical equipment so that the grounded side of the line for that piece of equipment or the housing for the equipment becomes hot and a considerable shock hazard is produced. Whether under industrial or home conditions such a dangerous occurrence can readily lead to injury.

SUMMARY OF THE INVENTION

It is therefore an object of the present invention to provide an improved safety device.

Another object is the provision of an improved ground-fault circuit interrupter.

These objects are attained according to the present invention in an apparatus having means for detecting a ground fault and switch means which is connected to this detector and automatically open-circuits the line to the device having the ground fault on detection of such a ground fault.

More specifically in accordance with this invention the apparatus is provided with a switch in series with the hot line leading to the piece of equipment in question. This switch is maintained closed only so long as no ground fault is detected. On detection of such a ground fault the switch is opened within thousands of a second so that a shock hazard is eliminted.

According to further features of the invention the switch is formed by a relay having a pair of normally open contacts in series with the hot line leading to the piece of equipment. This relay is normally energized so that its contacts are maintained closed and electricity is fed to the device being protected. A sensor relay is provided between the cold line running to the piece of equipment and the ground line attached to the housing thereof. When a voltage differential appears between the cold and ground lines this relay closes, thereby opencircuiting the other relay and causing its contacts to open and, therefore, disconnect the piece of equipment.

In accordance with further features of this invention the apparatus comprises in addition to the circuit relay having contacts in series with the hot line and a detector relay whose coil is connected between the cold and ground line, with a latching relay that is provided between the detector and circuit relays. Closing of the circuit relay causes this latching relay to close and remain closed, even after momentary actuation of the detector relay, so that the device holds the circuit open until it is reset.

According to yet another feature of this invention the latching relay is connected to a pair of indicators, simple lamps being useable. One of the indicators is illuminated when the circuit is in good operating condition and the other when the circuit is shorted. A test switch is provided for feeding a current to the detector coil and testing operation of the circuit, and a reset switch is provided for unlatching the latching relay after it has been closed.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings.

BRIEF DESCRIPTION OF THE DRAWING

The sole FIGURE of the drawing shows in schematic form a ground-fault circuit detector according to this invention.

DESCRIPTION OF THE PREFERRED EMBODIMENT

As shown in the FIGURE the apparatus according to the present invention is mounted on a printedcircuit board 23 having a terminal block 17 and adapted to be mounted in an outlet box having a three-connection plug 19. A source 18 of alternating current, here a 110-volt 60-cycle source, has a hot line 3 and a cold line 4 connected to two terminals on the block 17. Another terminal of the block 17 is connected to ground as shown at 20 and may be connected via a jumper as shown at 21 to the cold line 4. The socket 19 has a hot line 3', a cold line 4', and a ground line 5.

The printed circuit board 23 carries a relay 1,2 having a pair of contacts 1 which are normally open and lie in series between the terminals on the block 17 connected between the hot lines 3 and 3'. When the coil 2 of this relay 1,2 is energized the contacts 1 are closed and these two lines 3 and 3'are connected together. A jumper 22 connects the cold lines 4 and 4'. One side of the coil 2 is connected to the jumper 22 and, therefore, to the cold lines 4 and 4'. The other side of this coil 2 is connected through the contacts 7 of a relay 7,8 and a normally closed reset switch 13 to the hot line 3.

A detector relay 9,10 has a coil 9 one side of which is connected through the normally closed contacts of a test switch 14 to the ground line 5 and the other side of which is connected to the ground 20. The coil 9 is of very low impedance and the relay contacts 10 close with a very low current flowing through this coil 9 so that when the slightest voltage difference appears between the cold line 4' and the ground 5 the coil 9 will be energized sufficiently to close the contacts 10.

A short-circuit indicating light 12 has one side connected to the cold-line jumper 22 and another side connected via a half-watt 470,000 ohm resistor 15' to the back contacts of the relays 7,8 and 9,10. This short light 12 is red in color.

An OK light 6 of green color has one side connected to the jumper 22 and another side connected through a resistor 15" identical to the resistor 15' to the front contact of the relay 7,8.

The relay coil 8 of the relay 7,8 is connected across a bridge circuit 11 having one side connected via capacitor 24 to the jumper 22 and another side connected to the back contact of the relay 9,10.

The device functions as follows:

Under normal operating conditions, that is with no voltage differential between the lines 4' and 5 the relay coil 9 will not be energized and the contacts 10 will be open. Thus no electricity will be fed from the line 3 via the switch 13 and the contacts 10 to the short-light 12 and the bridge circuit 11, so that the relay coil 8 will not be energized. The contact 7 will therefore assume the position illustrated and current will be fed via the front contact 7 to the OK light 6, indicating no ground fault. Since the coil 8 is not energized the pole of the contacts 7 will lie against the front contact and, in addition to feeding voltage to the lamp 6 will feed voltage to the relay coil 2 and close the contacts 1. Thus the hot line 3 will be directly connected to the hot line 3' and the apparatus plugged into socket 19 will be able to function.

Should, however, a ground fault occur a voltage differential will appear across the lines 4' and 5. Even momentary energization of the coil 9 in this manner will cause the contacts 10 to close, thereby feeding electricity to the short light 12 and to the bridge circuit 11, so as to illuminate this red lamp 12 and energize the coil 8. The instant the coil 8 is energized it moves its pole away from the front contact to open-circuit the relay coil 2 and the lamp 6 and pulls it down on its back contact, connecting itself in parallel across the contacts 10 and insuring continued energization of the coil 8. Thus, the relay 7,8 will latch closed even if the relay 9,10 is only momentarily energized. De-energization of the coil 2 will cause the contacts 1 to open and will open-circuit the hot line 3' so that any shock hazard in the device plugged into the socket 19 is eliminated.

Once the hazard has been analyzed and repaired, the operator need merely press the reset button 13 on the device. This temporarily open circuits the relay coil 8 causing it to unlatch. As long as the ground fault does not reappear the relay coil 9 will not again be energized to close the relay 7,8 as described above, and the green light 6 will remain illuminated.

In order to test the device the singlepole double-throw switch 14 is pressed so as to feed electricity through a half-watt 15,000 ohm resistor 16 to the relay coil 9, momentarily energizing it and causing the circuit to react as if a ground fault had been detected. Pressing of the push-button switch 14 momentarily also disconnects the coil 9 from the ground line 5 in order to prevent feeding of even a small voltage into this ground line 5. After such a test operation the reset button 13 should again be actuated to put the device back into the proper state for the operation of a device plugged into the socket 19.

It will be understood that each of the elements described above, or two or more together, may also find a useful application in other types of circuits differing from the types described above.

While the invention has been illustrated and described as embodied in a ground-fault circuit interrupter, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A ground-fault circuit interrupter for connection between incoming hot, cold, and ground lines and outgoing hot, cold, and ground lines, said interrupter comprising:
   a test switch having a pair of test contacts and a pole normally lying against one of said test contacts, said one test contact being connected to said outgoing ground line;
   a resistor between the other of said test contacts of said test switch and one of said hot lines;
   a detector relay having a detector coil connected between said outgoing cold line and said pole and a pair of detector contacts actuatable on detection of a voltage differential between said outgoing cold and ground lines, whereby displacement of said pole against the other of said test contacts feeds current through said resistor to said detector coil;
   a main switch connected in series between said incoming hot line and said outgoing hot line; and
   control means connected between said detector contacts of said detector relay and said main switch for opening said main switch on actuation of said detector contacts on detection of said voltage differential and on energization of said detector coil by a current through said resistor.

2. The interrupter defined in claim 1 wherein said control means includes a circuit relay coil and said main switch is operated thereby, said circuit relay coil being connected to said contacts.

3. The interrupter defined in claim 2, further comprising means for maintaining said main switch open even after disappearance of said voltage differential.

4. The interrupter defined in claim 3 wherein said means for maintaining includes a latching relay having a latching coil connected to said detector contacts and having latching contacts connected to said circuit relay coil and said latching coil.

5. The interrupter defined in claim 4, further comprising a pair of alternately energizable indicators connected to said latching contacts and each energized in a respective position of said latching contacts.

6. The interrupter defined in claim 5, further comprising a reset switch operable to open-circuit said latching relay coil.

7. The interrupter defined in claim 5 wherein said indicators are lamps.

8. The interrupter defined in claim 5, further comprising a printed-circuit board carrying said relays, said switches, and said means.

9. A ground-fault circuit interrupter for connection between incoming hot, cold, and ground lines and outgoing hot, cold, and ground lines, said interrupter comprising:
   a detector relay having a coil connected between said outgoing cold and ground lines and a pair of contacts actuatable on detection of a voltage differential between said outgoing cold and ground lines;
   a switch connected in series between said incoming hot line and said outgoing hot line; and
   control means connected between said contacts of said detector relay and said switch for opening said switch on actuation of said contacts from detection of said voltage differential, said control means including a circuit relay coil having a pair of sides one of which is connected to both of said cold lines and juxtaposed with said switch for closing same when energized, and a latching relay having a latching coil with one side connectable through said contacts to said incoming hot line, said latching relay having a pole connected to said incoming hot line, a front contact against which said pole normally lies connected to the other side of said circuit relay coil, and a back contact connected to the other side of said latching relay coil.

* * * * *